United States Patent [19]

Smith

[11] 4,111,110

[45] Sep. 5, 1978

[54] PORTABLE CHEESE PRESS FRAME ASSEMBLY

[75] Inventor: Gary R. Smith, Watertown, Wis.

[73] Assignee: Kusel Equipment Company, Watertown, Wis.

[21] Appl. No.: 803,793

[22] Filed: Jun. 6, 1977

[51] Int. Cl.² .................. A01J 25/10; A01J 25/15
[52] U.S. Cl. ......................... 99/456; 99/460; 100/116; 100/237
[58] Field of Search .............. 99/456, 458–460; 100/110, 125, 126, 237; 425/84; 426/478, 491, 495, 512, 517

[56] References Cited

U.S. PATENT DOCUMENTS

| 3,355,805 | 12/1967 | Krueger et al. | 99/458 |
| 4,045,152 | 8/1977 | Peterson et al. | 99/456 |

FOREIGN PATENT DOCUMENTS 1,146,692  4/1963  Fed. Rep. of Germany ............ 99/460

Primary Examiner—Harvey C. Hornsby
Assistant Examiner—Timothy F. Simone
Attorney, Agent, or Firm—James E. Nilles

[57] ABSTRACT

A portable assembly for supporting stacks of cheese hoops in an inclined position from the vertical and including means for pressing the stacked hoops so as to press the whey therefrom and permit it to drain downwardly from one hoop to the other where it is collected by means of an inclined floor. The frame includes support members for removably but firmly holding the stacks of hoops as they are being pressed by cylinder and piston units located at the top of the assembly. Control means are provided for actuating the units in extending or contracting directions.

4 Claims, 8 Drawing Figures

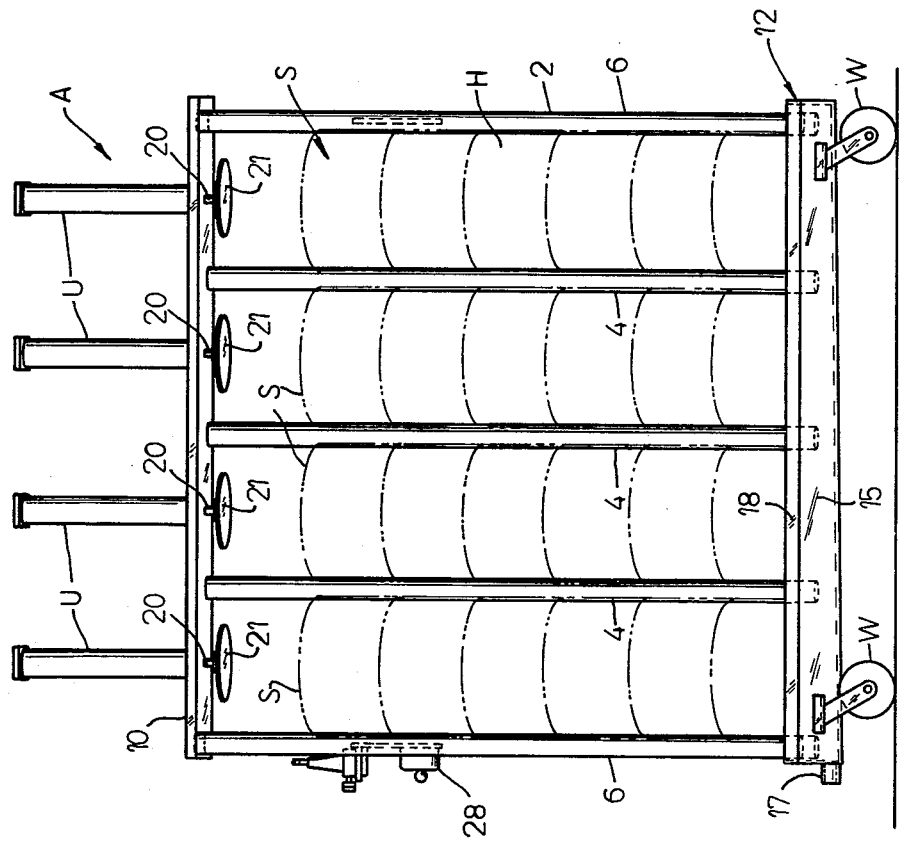
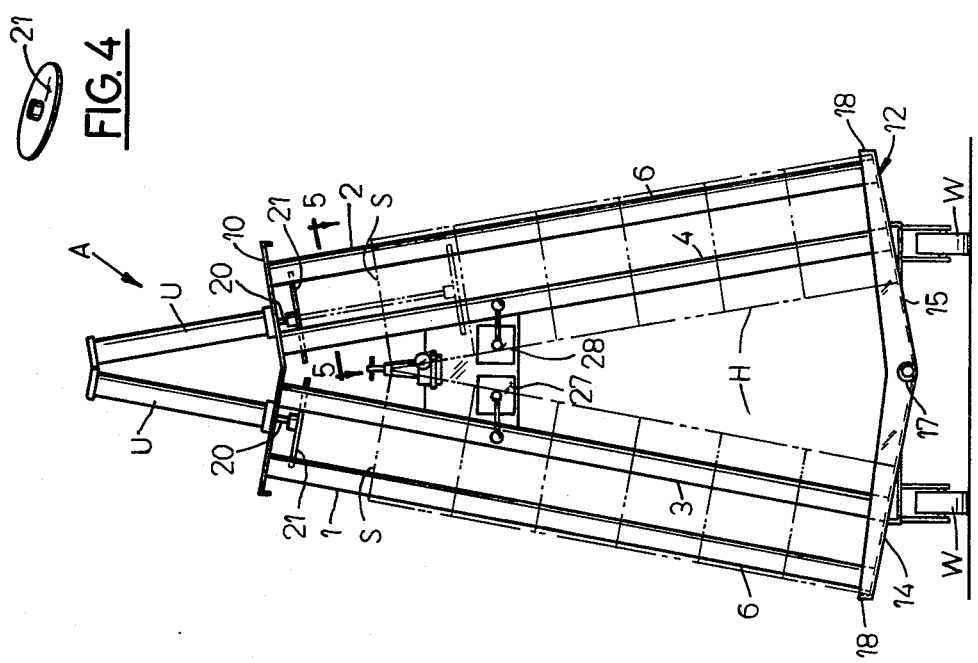

PORTABLE CHEESE PRESS FRAME ASSEMBLY

SUMMARY OF THE INVENTION

The present invention provides a portable cheese press assembly for removably supporting stacks of cheese hoops that are filled with curd and having means for pressing the stacks of hoops so that the whey can drain downwardly one from another and be collected in an inclined floor and drain at the bottom of the assembly. The assembly includes inclined support members for the stacks of hoops, which members securely hold the stacks and prevent them from kicking out as the pressing occurs. One form is such that the assembly has two sides which converge upwardly towards one another and wherein the support members can hold two rows of stacks of hoops in back-to-back and upwardly converging relationship. Extendible and contractable cylinder units are mounted on the top of the assembly and have control means for causing their actuation so that the units can press the individual stacks of hoops for the required amount of time and with the required degree of pressure.

The assembly is such that the hoops can be easily stacked securely in position and are held firmly while the pressing occurs. After the pressing operation, the hoops can be easily removed. During the pressing operation the whey is collected in a sanitary and efficient manner.

These other objects and advantages of the present invention will appear hereinafter as this disclosure progresses, reference being had to the accompanying drawings.

BRIEF DESCRIPTION OF THE DRAWINGS

FIG. 2 is an end elevational view of the assembly shown in FIG. 1;

FIG. 3 is a side elevational view of the assembly shown in FIG. 1;

FIG. 4 is a perspective view of one of the pressing elements on the piston rod of the cylinder and piston unit;

DESCRIPTION OF A PREFERRED EMBODIMENT

Figure 1:
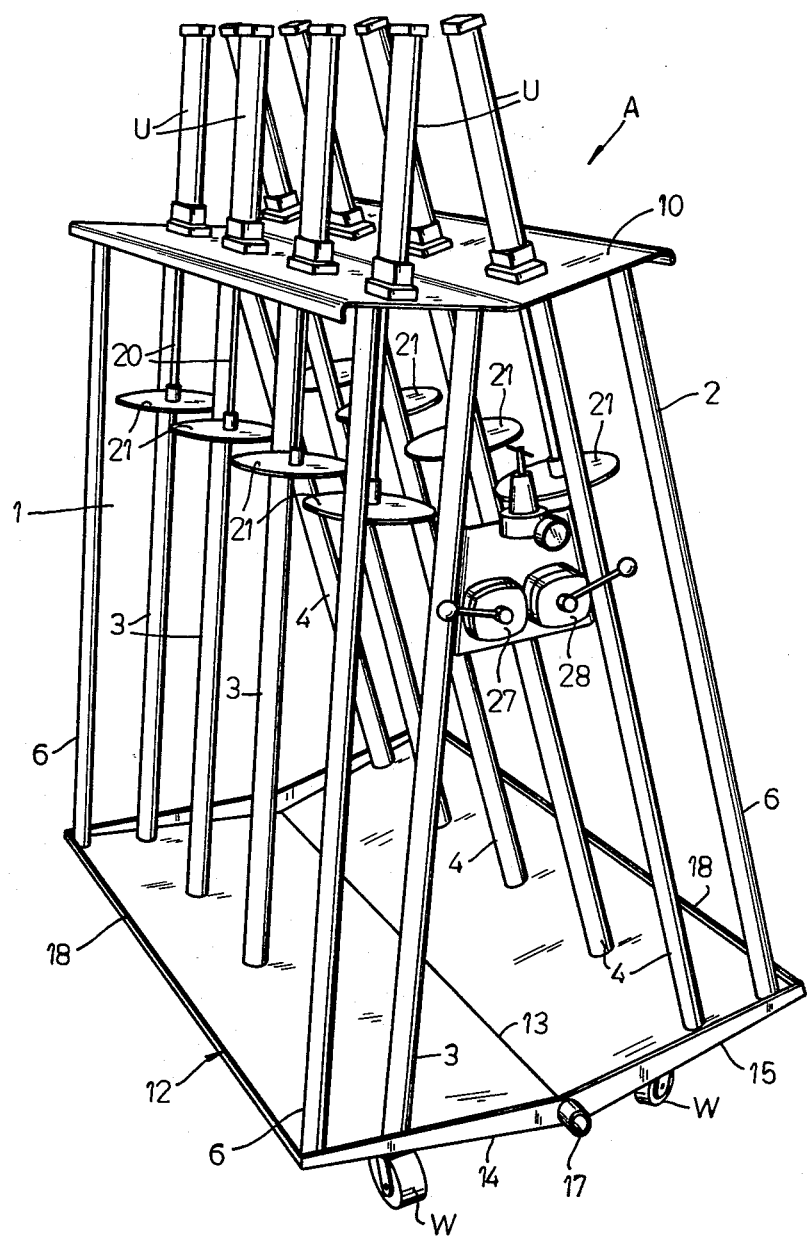
FIG. 1 is a perspective view of a portable cheese press assembly made in accordance with the present invention.

The assembly A as clearly shown in FIG. 1 includes opposite sides 1 and 2 which include hoop supporting members 3 and 4 that are arranged at an incline from the vertical and in upwardly and converging relationship with one another, so as to form a generally A shape of the assembly when viewed in end elevation. Additional braces 6 are provided at each of the corners of the assembly. The members 3, 4 and 6 are rigidly attached together at their upper end by the top wall 10 which is fabricated from sheet steel. The members 3, 4 and 6, for example, can be welded to the top wall 10 so as to form a rigid structure therewith. The assembly also includes a floor 12 which is bent along its center length as at 13 so as to form a generally V-shaped pan-like floor having inwardly and downwardly converging bottom portions 14 and 15 that act to convey whey to the center of the floor and out of the discharge drain 17 at one end. A small, upwardly turned flange 18 extends around the pan-like floor to prevent loss of liquid whey. Members 3, 4 and 6 are preferably welded to the floor 12 so as to form a joint-free, sanitary and rigid connection between the parts.

Suitable floor engaging wheels W are provided adjacent each corner of the assembly so as to render the assembly mobile.

Figure 6:
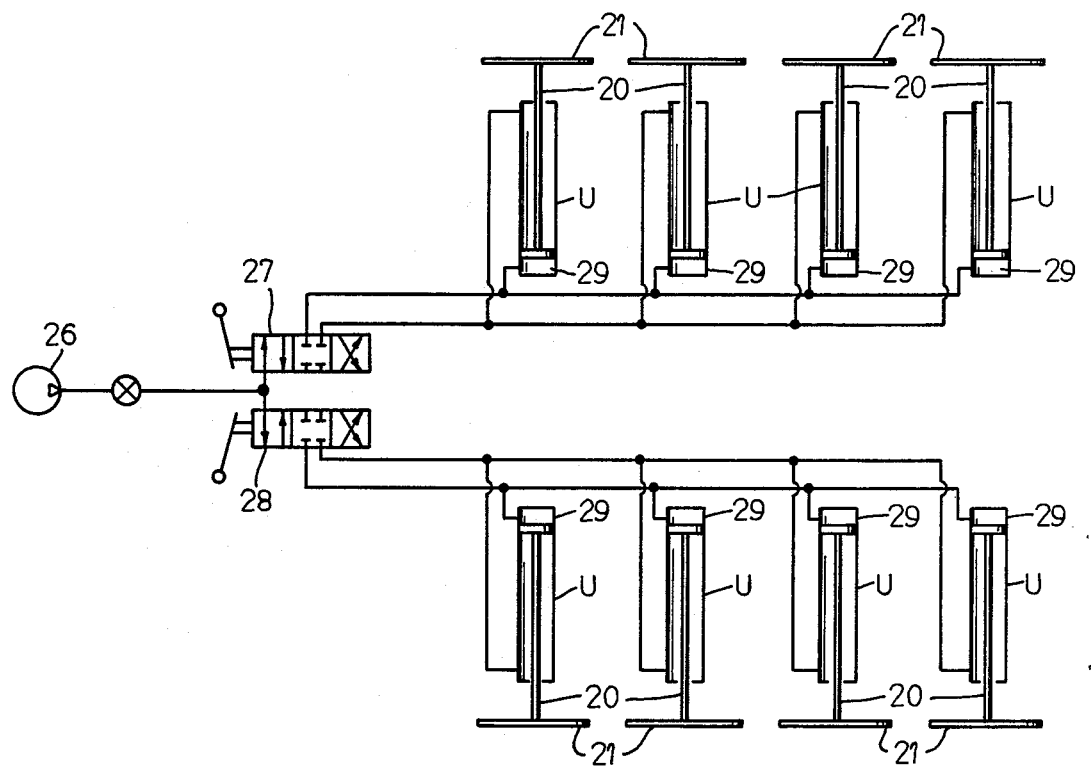
FIG. 6 is a schematic pneumatic circuit of the control system for the cylinder and piston unit.

Means are provided for pressing downwardly on the stacks S of individual hoops H so as to force the whey to drain downwardly from one hoop to the other where it is eventually collected on the floor 12 and conveyed out of the drain 17. This pressing means includes a cylinder and piston unit U, one located above each of the stacks S of hoops and including a piston rod 20 having a pressing element 21 attached to its bottom and for contact with the top of the stack of hoops. The units are preferably air-actuated and when air is admitted from the source 26 through the directional valves 27 and 28, the head end 29 of the cylinder is pressurized with air so as to cause extension of the piston in the known manner. The valves 27 and 28 are shown in the position in FIG. 6 where they act to pressurize the units U which are arranged in series along sides 1 and 2. When the valves 27 and 28 are shifted in the opposite direction in the known manner, pressure is admitted to the rod ends of the cylinders to cause retraction thereof. Directional valve 27 serves all units U along side 1 and valve 28 serves all the units along side 2.

Figure 5:
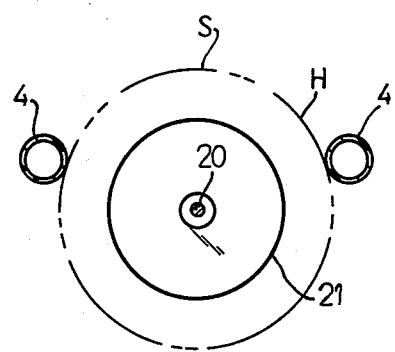
FIG. 5 is a sectional view taken along line 5—5 in FIG. 2.

It will be noted that members 3 and 4 are spaced along the length of the assembly in such a manner that, as shown in FIG. 5, the hoops are firmly nested between the pairs of adjacent members and securely held during the pressing operation. Furthermore, and importantly, by inclining the stack of hoops from the vertical position, the stack is prevented from kicking out, particuarly at the bottom thereof, during the pressing operation. Furthermore, by arranging the stacks in the inclined position from the vertical, it is easy to load the assembly, that is to stack the hoops one upon the other or to remove the hoops from the assembly, without causing the hoops to be tipped over or otherwise misaligned.

Also by inclining the stacks of hoops, drainage downwardly from one hoop to another is facilitated and the drained whey is efficiently collected on the inclined floor.

Figure 7:
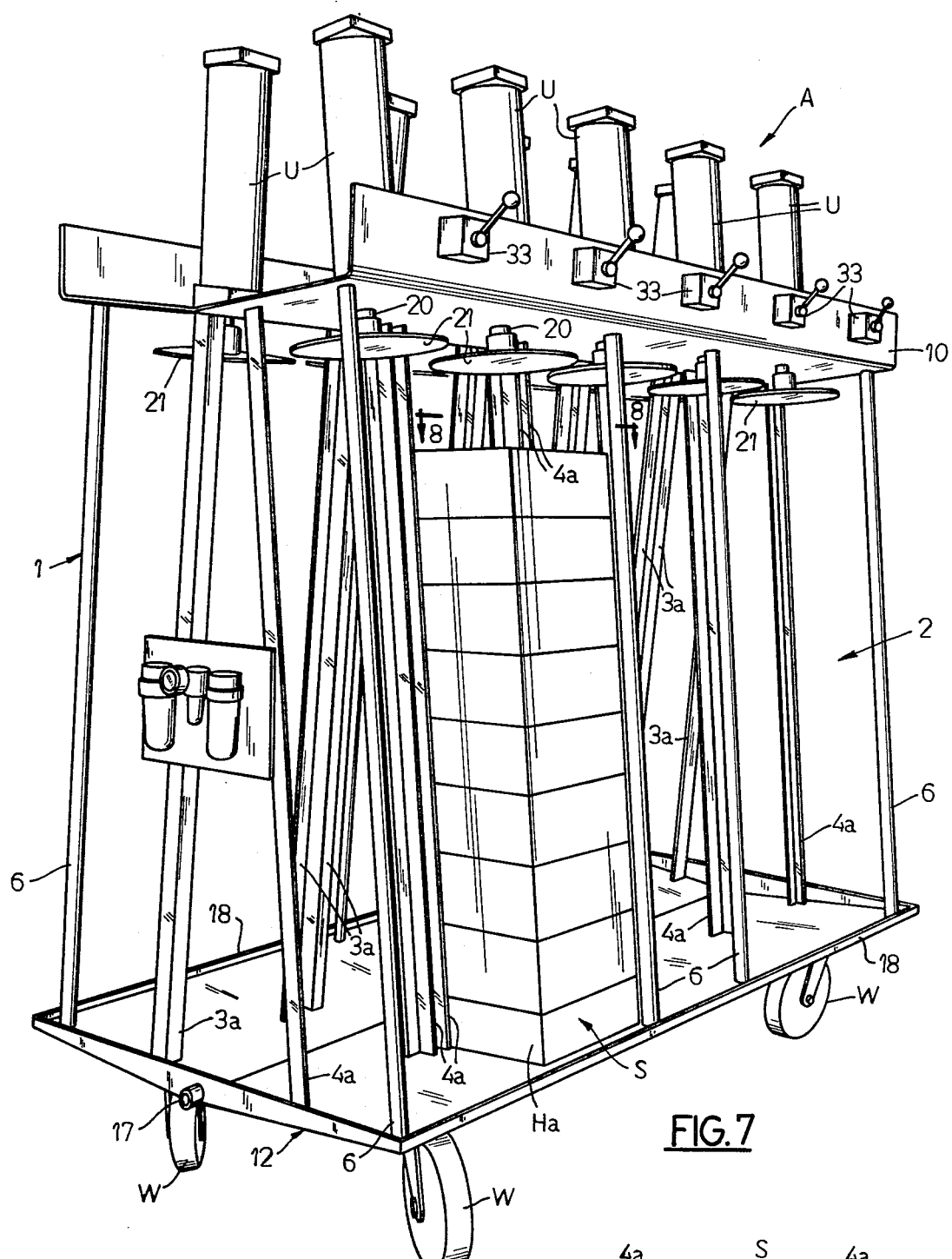
FIG. 7 is a view similar to FIG. 1, but showing a modified frame of the assembly for accommodating rectangular hoops.
Figure 8:
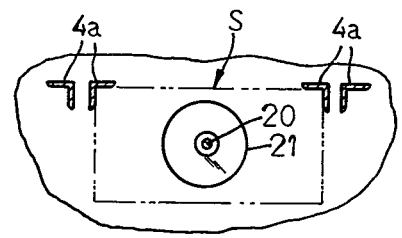
FIG. 8 is a cross sectional view taken along line 8—8 in FIG. 7.

In the embodiment shown in FIG. 7, components similar to those shown in FIG. 1 have been correspondigly numbered. In this embodiment, however, rectangular shaped hoops Ha are used and the support members for accomodating these rectangular hoops are formed of steel angle iron members 3a, one of which is located at each of the rear corners of the hoops Ha whereby the hoops are securely held between pairs of steel angle iron members 3a and 4a, as clearly shown in FIG. 8. Thus, the rectangular hoops are easily loaded between the adjacent pairs of support members and can be easily removed therefrom, and during the operation when the hoops abuttingly lean against the support members, they are held in a stable position because of the incline.

Also in the FIG. 7 embodiment, individual selector valves 33 are provided for each of the cylinder piston units U so that the units U are individually actuated.

GENERAL

The entire assembly can be easily rolled to the vat or to filling equipment, to the air supply station for pressing and when completed, the entire assembly can be wheeled to a hoop removal or packaging area. The bottom floor accommodates whey and drains it out one end. The air actuated cylinder and piston units provide constant even pressure to each stack. The stacks are secure and need no additional locking or bracing device and only a minimum of handling and guiding of the hoops into position is required.

I claim:

1. A portable cheese press frame assembly for removably supporting hoops stacked one upon another in a generally vertical position and for pressing the curd in said hoops to cause draining of the whey therefrom, said assembly comprising a generally A-shape frame including opposite sides which converge towards one another in an upward direction, said sides including support members for supporting stacks of hoops in a position inclined from the vertical, said members spaced apart from one another so as to securely receive said hoops in stacked relationship and for supporting them during a curd pressing operation, cylinder and piston units mounted on the top of said frame and including an extensible piston member extending downwardly for pressing the curds in said hoop, control means carried by said assembly for actuating said cylinder and piston units in extending and contracting directions, said assembly also including a pan-like floor at the bottom thereof and having a drain, said floor being inclined towards said drain so as to receive whey drained from said hoops, whereby as said cylinder and piston units are extended to press the curd located in said generally vertically stacked hoops, the whey from said hoops drains downwardly and onto said floor and out said drain.

2. The assembly set forth in claim 1 further characterized in that said support members are spaced apart from one another to accommodate cylindrical hoops, said members being spaced apart from one another a distance sufficient to receive a portion of said cylindrical hoops therebetween in abutting relationship thereagainst.

3. The assembly set forth in claim 1 further characterized in that said support members are angle iron members which supportingly receive the corners of a rectangular hoop.

4. A portable cheese press frame assembly for removably supporting hoops stacked one upon another in a generally vertical position and for pressing the curd in said hoops to cause draining of the whey therefrom, said assembly comprising a generally A-shape frame including opposite sides which converge towards one another in an upward direction, wheel means on said frame for rendering the latter mobile, said sides including support members for supporting stacks of hoops in a position inclined from the vertical, said members spaced apart from one another so that said hoops lean against and between said members for firmly supporting said hoops during a curd pressing operation, cylinder and piston units mounted on the top of said frame and including an extensible piston member extending downwardly for pressing the curds in said hoop; control means carried by said assembly for actuating said cylinder and piston units in extending and contracting directions, said control means including a manually operated direction selection valve for each side of said assembly; said assembly also including a pan-like floor at the bottom thereof, said floor being inclined from both sides downwardly towards the center of said assembly so as to receive whey drained from said hoops, said floor also having a drain for said whey whereby as said cylinder and piston units are extended to press the curd located in said generally vertically stacked hoops, the whey from said hoop drains downwardly and onto said pan-like floor and out said drain.

* * * * *